US012623240B1

(12) United States Patent
Hagberg

(10) Patent No.: US 12,623,240 B1
(45) Date of Patent: May 12, 2026

(54) RETRACTABLE SPRAY SHIELD FOR AGRICULTURAL USE

(71) Applicant: Mark T. Hagberg, Lafayette, MN (US)

(72) Inventor: Mark T. Hagberg, Lafayette, MN (US)

( * ) Notice: Subject to any disclaimer, the term of this patent is extended or adjusted under 35 U.S.C. 154(b) by 667 days.

(21) Appl. No.: 18/045,464

(22) Filed: Oct. 10, 2022

Related U.S. Application Data

(60) Provisional application No. 63/287,035, filed on Dec. 7, 2021.

(51) Int. Cl.
| | |
|---|---|
| *B05B 12/34* | (2018.01) |
| *A01M 7/00* | (2006.01) |
| *B05B 1/20* | (2006.01) |

(52) U.S. Cl.
CPC ........... *B05B 12/34* (2018.02); *A01M 7/0042* (2013.01); *A01M 7/0064* (2013.01); *B05B 1/20* (2013.01)

(58) Field of Classification Search
CPC ........... B05B 12/24; B05B 12/20; B05B 1/20; B05B 12/34; B05B 12/36; B05B 1/28; B05B 13/005; A01M 7/0042; A01M 7/005; A01M 7/0053; A01M 7/0057; A01M 7/0064; A01M 7/0075; A01C 23/00–047; A01D 2101/00; A47K 3/281; B08B 1/00
USPC ............ 239/722–749, 273–285, 103, 77, 78, 239/159–170, 172, 176, 150, 288, 288.3, 239/288.5, 521, 524; 242/557
See application file for complete search history.

(56) References Cited

U.S. PATENT DOCUMENTS

| | | | |
|---|---|---|---|
| 2,589,020 | A | 3/1952 | North, Jr. |
| 3,445,961 | A | 5/1969 | Elsworth |
| 3,565,341 | A | 2/1971 | Burroughs |
| 3,793,872 | A | 2/1974 | Logan |
| 4,124,221 | A | 11/1978 | Goings |
| 4,274,589 | A | 6/1981 | Jones |
| 4,927,080 | A | 5/1990 | Alsing |
| 4,947,581 | A | 8/1990 | Claussen et al. |
| 4,986,473 | A | 1/1991 | Semple et al. |
| 5,062,572 | A | 11/1991 | Reiter et al. |
| 5,139,200 | A | 8/1992 | Greimann et al. |
| 5,549,457 | A | 8/1996 | Flores et al. |
| 6,273,111 | B1 | 8/2001 | Weiss et al. |
| 7,063,273 | B2 | 6/2006 | Hahn et al. |
| 8,066,304 | B2 | 11/2011 | Ulgen |
| 8,573,510 | B2 | 11/2013 | Bisson et al. |
| D702,124 | S | 4/2014 | Harrower et al. |
| 10,315,211 | B1 | 6/2019 | Hagberg |

(Continued)

*Primary Examiner* — Arthur O. Hall
*Assistant Examiner* — Juan C Barrera
(74) *Attorney, Agent, or Firm* — Albert W. Watkins

(57) ABSTRACT

A retractable spray shield for agricultural use has a spray barrier; a two-part storage tube; a deployment and concealment drive having a motor, a drive shaft, and a quadrilateral linkage that in one direction deploys the spray barrier from the storage tube and in a second opposed direction conceals the spray barrier within the storage tube. The quadrilateral linkage is defined by a rotating arm; a pushing arm coupled to the drive shaft; the bottom of a unit storage tube, and a transfer arm supporting the spray barrier. The spray barrier has a generally triangular and flaccid liquid barrier film, a pair of framing legs coupled to opposed edges of the liquid barrier film, and a spring configured to operatively stretch the pair of framing legs apart from each other and thereby expand the barrier film toward a planar, generally triangular geometry when deployed.

11 Claims, 12 Drawing Sheets

(56)           References Cited

U.S. PATENT DOCUMENTS

| 10,464,080 | B1 * | 11/2019 | Hagberg | ............. | A01M 7/0064 |
| 11,465,164 | B1 | 10/2022 | Hagberg | | |
| 2011/0022231 | A1 | 1/2011 | Walker et al. | | |
| 2016/0121355 | A1 | 5/2016 | Claussen et al. | | |

* cited by examiner

RETRACTABLE SPRAY SHIELD FOR AGRICULTURAL USE

BACKGROUND OF THE INVENTION

1. Field of the Invention

The present invention pertains generally to fluid spraying, and more particularly to a retractable spray shield for agricultural use that deflects the flow from at least one spray nozzle.

2. Description of the Related Art

Modern agriculture has for most of a century advanced in productivity more than many other industries. Most consumers are generally unaware of these significant advances. However, the consumer has benefitted greatly, in particular because of the lower-than-inflation price changes in many agricultural products through this long time period. Most agricultural operations today incorporate extremely technically advanced machinery, seed, and chemicals that allow one person to do the work that even only a few decades ago required many. One particularly common and exemplary machine is the tractor, which has increased greatly in size, power, and in the many diverse attachments that are used to facilitate operations.

The commercial production of many agricultural crops involves the spraying of one or more chemicals such as herbicides, fertilizers, insecticides, or fungicides. The products being sprayed may be used to improve the health of the desired crop, or to eliminate or reduce detrimental interaction with diseases, pests, and competing weeds. To reduce the time required to apply these products to the crop, very large sprayers have been produced that carry a large liquid tank, a pump having a fluid inlet coupled into the liquid tank, at least one boom arm typically extending generally transversely to the direction of travel, and a plurality of spray nozzles supported by the boom and coupled through liquid supply lines to the pump outlet. The sprayer may be an attachment to a tractor, or an entirely separate machine. A person operating the sprayer will typically be able to control the pump to turn on or off the spray, and in many cases to control the pump pressure, which in turn controls the rate of delivery of the liquid to the crop. Through the use of this equipment, spraying of liquid chemicals is both time efficient and controllable to the needs of a particular crop, field, or even location within a field. As a result, a relatively precise amount of chemical may be applied rapidly to a large area.

As may be appreciated, the quantity of spray delivered to a crop can be relatively precisely controlled beneath the boom. When multiple passes are made across a field, for each pass the end of the boom arm can be located offset by the right amount from the previous pass to provide just the right amount of overlap in the spray coming out beyond the end of the boom. However, the sprayer will only pass over the edges of the field once. Consequently, adjacent to the edges of the field a tractor operator will normally make sure the last row of crop will be under the last sprayers, to ensure adequate liquid is delivered to this final row. Unfortunately, this also means that spray will be delivered beyond the last row of crop, typically on to adjacent plants. As may be appreciated, these adjacent plants are not a part of the desired crop, and so may include an adjacent field containing a different crop, a grass covered ditch, a neighboring property under different ownership, or undesirable weeds.

In the case of the application of an herbicide with the overspray falling onto a different crop, a grass covered ditch, or a neighboring property, those adjacent plants undesirably may be killed or seriously harmed by the spray. In the case of undesirable weeds, and since these weeds are not immediately under the boom and are instead being treated with overspray, the concentration of application is generally less than that intended for application to the field. As a result, the overspray may not be sufficient to kill the weeds, and so may instead lead to the development of weeds resistant to the spray. These weeds may then encroach upon the desired crop, hurting the yield or value of the harvested crop. Similar deficiencies may be encountered in the case of insecticides and fungicides, such as where adjacent insects may develop insecticide resistance. In the case of a fertilizer overspray, adjacent weeds may be undesirably strengthened and stimulated. Consequently, and for a variety of reasons, it is desirable to reduce or eliminate overspray adjacent to the edges of a field, while not interfering with the spray within the middle of the field.

To reduce the overspray, artisans have designed various shields that are designed to enclose a single row of crop. The spray nozzles are mounted to spray into the interior of the shield, and thereby avoid spray into the between row spaces and to prevent overspray. Exemplary U.S. patents and published applications, the teachings which are incorporated herein by reference, include: U.S. Pat. No. 3,445,961 by Elsworth, entitled "Agriculture spraying machines", which illustrates a pair of plastic guides that gently squeeze the plants together, and a liquid that is sprayed interior of the guides into the squeezed plants; and U.S. Pat. No. 4,947,581 by Claussen et al, entitled "Spray shield assembly", which illustrates a set of shields in the general shape of an upside-down "U" channel open on both ends but closed on the top and sides. For some applications, such as that of a fertilizer, either of these apparatus will reduce or avoid undesirable overspray on to other plants besides the agricultural crop. However, for other liquid applications, particularly herbicide applications, the entire field needs to be sprayed, making these shields useless for such applications. Furthermore, these shields must be set for a particular row spacing, meaning they will typically require resetting for each different species of crop. The variable height of different species and different stages of maturity are also challenging. Finally, there are many times when a spray will be most effectively sprayed by nozzles spraying at an angle closer to parallel to the ground than perpendicular thereto. Spray from relatively more horizontally pointing nozzles that misses the immediately adjacent row of crop, such as when the spray nozzle is pointing between sequential plants in a row, may still end up being applied to plants in a nearby row. In the case of a shield such as illustrated by either Elsworth or Claussen et al, any spray that misses the plant will instead be applied only to the shield, and from there will drip onto the soil without ever contacting the plant.

Additional U.S. patents illustrate fixed shields for crops, the relevant teachings and contents which are incorporated herein by reference, including: U.S. Pat. No. 2,589,020 by North, Jr, entitled "Spraying device"; U.S. Pat. No. 4,274,589 by Jones, entitled "Spraying apparatus employing a skirt structure"; U.S. Pat. No. 4,986,473 by Semple et al, entitled "Crop sprayer shield"; U.S. Pat. No. 5,139,200 by Greimann et al, entitled "Shield for agricultural sprayer"; U.S. Pat. No. 7,063,273 by Hahn et al, entitled "Spray delivery system"; and U.S. Pat. No. 8,573,510 by Bisson et al, entitled "Drift shroud system for spray booms of turf sprayer". Unfortunately, these prior art shields are quite large and designed to operate close to the ground, and so are susceptible to damaging interference with rocks, roots, mounds, and other obstacles in the ground. As with the Elsworth or Claussen et al shields, these shields are fixed in geometry. This means that even in the middle of the field, the farthest transverse edges (the left and right extremes) of the shields will undesirably block spray from reaching plants, and will instead drip the spray onto the earth. Any fixed shields that do not block the spray on the transverse edges will likewise not prevent the undesirable overspray discussed herein above.

Additional patents of varying relevance, the relevant teachings and contents which are incorporated herein by reference, include: U.S. Pat. No. 3,565,341 by Burroughs, entitled "Spraying apparatus"; U.S. Pat. No. 4,124,221 by Goings, entitled "Spray guard for vehicles"; U.S. Pat. No. 4,927,080 by Alsing, entitled "Field spraying device"; U.S. Pat. No. 5,062,572 by Reiter et al, entitled "Spray shield"; U.S. Pat. No. 5,549,457 by Flores et al, entitled "Pavement sprayer having movable spray guard"; U.S. Pat. No. 8,066, 304 by Ulgen, entitled "Retractable mud flap for vehicles"; and Des 702,124 by Harrower et al, entitled "Rotatable spray shield device".

The present inventor has also contributed to this field, including U.S. Pat. Nos. 10,464,080 and 11,465,164, the teachings which are incorporated herein by reference.

In addition to the foregoing patents, Webster's New Universal Unabridged Dictionary, Second Edition copyright 1983, is incorporated herein by reference in entirety for the definitions of words and terms used herein.

As may be apparent, in spite of the enormous advancements in agriculture and substantial research and development that has been conducted, there still remains a need for a spray shield that will permit efficient spraying in the middle of a field while also selectively blocking overspray at the field edges.

SUMMARY OF THE INVENTION

In a first manifestation, the invention is, in combination, an agricultural spray machine, an agricultural spray boom, and a retractable spray shield for agricultural use. The agricultural spray machine has a drive train; a liquid tank; and a pump receiving a liquid held within the liquid tank. The agricultural spray boom has a boom arm extending at least in part in a direction transverse to a forward direction of travel of the agricultural spray machine; and at least one spray nozzle suspended from the boom arm and in fluid communication with the pump. The retractable spray shield for agricultural use has a liquid barrier film; a storage tube configured to receive and store the spray shield, the storage tube having a storage tube bottom and a storage tube length, the storage tube length defining a storage tube longitudinal axis, a unit holder having a length defining a unit holder longitudinal axis, the unit holder supporting the liquid barrier film, and a pintle defining an axis of rotation transverse to the storage tube and coupling the unit holder to the storage tube, the pintle configured to allow the unit holder to pivot about the pintle; a deployment drive rotating the liquid barrier film relative to the storage tube between a first stored position adjacent to the storage tube and a second deployed position more perpendicular to the clam-shell storage tube; and a boom arm coupler adapted to couple the retractable spray shield to the agricultural spray boom and simultaneously locate the liquid barrier film in the second deployed position adjacent to and in a spray pattern of the at least one spray nozzle.

In a second manifestation, the invention is a selectively deployable spray shield for agricultural use. A spray barrier has a first concealed spray barrier position in which the spray barrier is inoperative, and a second deployed spray barrier position configured to block at least a portion of a spray emanating from an agricultural sprayer. A storage tube is configured to receive and store the spray shield. The spray shield has: a storage tube bottom and a storage tube length, the storage tube length defining a storage tube longitudinal axis; a unit holder having a length defining a unit holder longitudinal axis, the unit holder supporting the liquid barrier film; and a pintle defining an axis of rotation transverse to the storage tube and coupling the unit holder to the storage tube, the pintle configured to allow the unit holder to pivot about the pintle. A deployment drive rotates the liquid barrier film relative to the storage tube between a first stored position adjacent to the storage tube and a second deployed position more perpendicular to the storage tube.

Objects of the Invention

Exemplary embodiments of the present invention solve inadequacies of the prior art by providing a retractable spray shield for agricultural use. The retractable spray shield has a liquid barrier film; a storage tube; a deployment and concealment drive that in one direction deploys the liquid barrier film from the storage tube and in a second direction opposed to the first direction conceals the liquid barrier film within the storage tube; and a pivotal quick release support and boom arm coupling.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide an apparatus that may be deployed to reduce or eliminate overspray adjacent to the edges of a field, and which may be concealed so as to not interfere with spray within the middle of the field. A second object of the invention is to enable the apparatus to be deployed or concealed from within the cab of a spray vehicle, without necessitating the operator to disembark from the cab. Another object of the present invention is to facilitate the spraying of a variety of fields, without the need for mechanical adjustment to a particular species, or plant height and maturity. A further object of the invention is to provide apparatus that is effective with a spray emanating generally at an angle closer to parallel to the ground than perpendicular thereto. Yet another object of the present invention is to achieve the foregoing objectives with an apparatus that is easily fabricated and which may be easily installed upon both new and existing spray boom arms.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
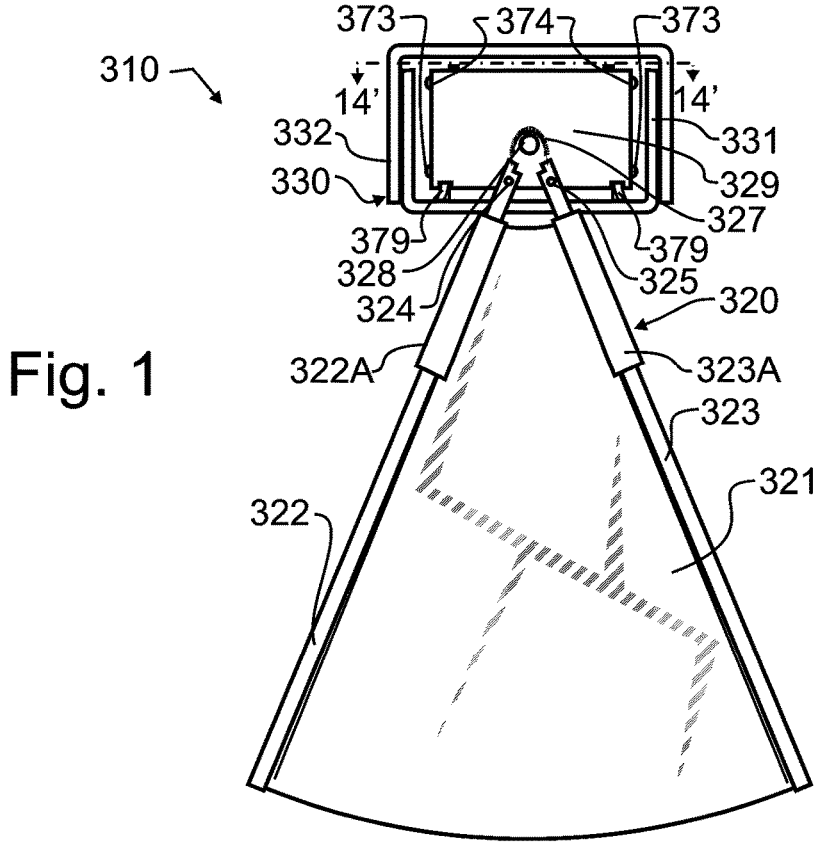
FIGS. 1-2 illustrate a first alternative embodiment retractable spray shield for agricultural use designed in accord with the teachings of the present invention in a deployed configuration from a side elevational view and a top sectioned plan view, respectively.

Manifested in the preferred and first alternative embodiments, the present invention provides a retractable spray shield assembly designed for agricultural use in combination with a prior art agricultural spray boom. The retractable spray shield assembly comprises a spray shield, storage tube, and deployment drive.

In the deployed position, the spray shield will preferably not interfere with spray emanating from a spray nozzle that is directed generally downward therefrom toward crop plants. However, spray emanating in a more horizontal direction generally parallel to the longitudinal axis of a prior art agricultural spray boom will contact a liquid barrier film, meaning spray nozzles will effectively be blocked from over spraying in that direction.

When a pass along the edge of a field is complete, and the subsequent passes will be within the field rather than along an edge, then the operator will control the retractable spray shield assembly to retract the spray shield, allowing the spray nozzles to again overspray adequately to ensure complete coverage within the middle of the field.

As may be apparent then, the operator simply deploys the retractable spray shield immediately in advance of prior art agricultural spray boom passing adjacent to the field edge. When the field edge has been traversed, the operator again simply retracts the retractable spray shield assembly.

FIGS. 1 through 9 illustrate a first alternative embodiment retractable spray shield assembly 310. Retractable spray shield assembly 310 incorporates linear actuator 340 of known type, which for exemplary and non-limiting purpose includes an electrically driven motor 341, a gear box 342, and linear drive shaft 343. Linear drive shaft 343 drives pushing arm 375 of a quadrilateral linkage 370 forward or backward around pivot 371. Quadrilateral linkage 370 is comprised of four sides made up of pushing arm 375, pivot arm 376, the distance between lower pivots 371 and 372 which are held in position by storage tube bottom 331, and the distance between the upper pivots 373 and 374 which are affixed to spray shield transport plate 329. Linear actuator 340 is preferably pivotally supported by the bottom of storage tube 331, with linear drive shaft 343 extending generally longitudinally parallel to the longitudinal axis of storage tube 330. At the end of drive shaft 343 distal to gear box 342, a pivotal coupling 344 is provided, which may for exemplary and non-limiting purpose comprise a U-shaped bracket affixed to the end of drive shaft 343. Any suitable pivotal coupling may be substituted therefore.

Figure 2:
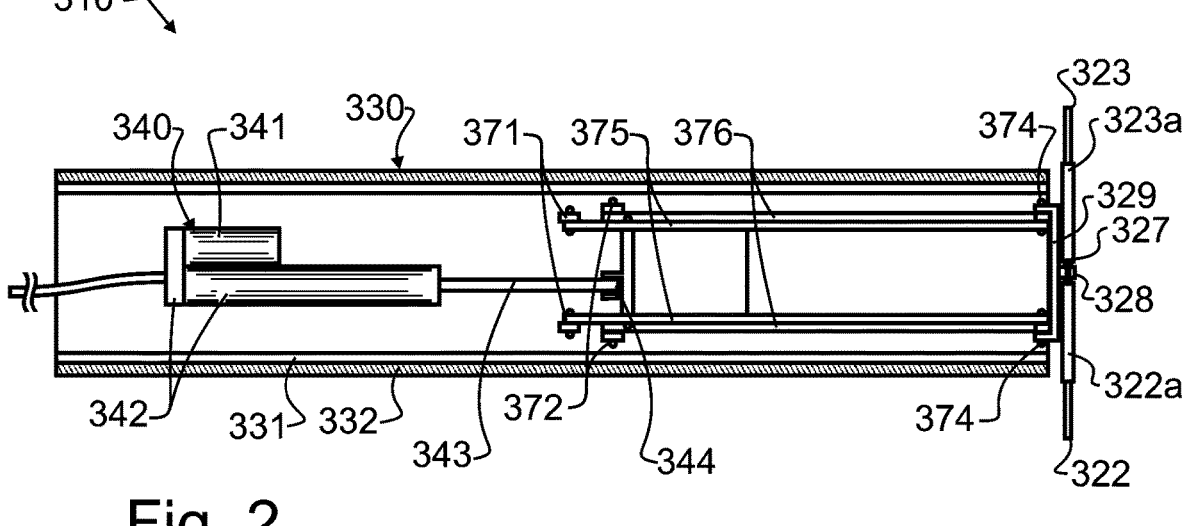

FIGS. 1 and 2 illustrate the retractable spray shield assembly 310 in its deployed position. When spray shield 320 is deployed, tension spring 327 wraps around spring guide post 328 and pulls on framing legs 322, 323. Framing legs 322, 323 rotate about pintles 324, 325 under the force of tension spring 327, biasing framing legs 322, 323 to hold liquid barrier film 321 in an open position. Pintles 324, 325 and spring guide post 328 are affixed to spray shield support plate 329 and guide spray shield 320 as it moves through the path that quadrilateral linkage 370 defines.

When spray shield 320 is in the deployed position of FIGS. 1 and 2, spray shield storage tube top 332 remains parallel and touching storage tube bottom 331 by the force of gravity. While not separately illustrated, spray shield storage tube top 332 is pivotally affixed to storage tube bottom 331, and so is free to rotate in a clockwise and counterclockwise manner as illustrated in FIGS. 5-9, in a clam-shell manner described further herein below. However, in one alternative embodiment, a spring is provided to pull spray shield storage tube top 332 toward a parallel alignment with storage tube bottom 331. In other alternative embodiments, other assists may be provided to achieve this objective. Again for exemplary and non-limiting purpose, a linear track such as a longitudinally extensive bar or U-channel may be provided that extends longitudinally just below the top of spray shield storage tube top 332. In this alternative embodiment, pivot 374 comprises in part a pin that protrudes from the sides of spray shield transport plate 329, and this pin is configured to slide within the linear track. In such embodiment, spray shield storage tube top 332 will follow the movement of pivot 374 and spray shield transport plate 329, irrespective of wind, bumps, and the like that might otherwise lift spray shield storage tube top 332.

As best visible in FIG. 2 when spray shield 320 is in the deployed position, linear drive shaft 343 is fully extended by linear actuator 340. Linear drive shaft 343 rotates pushing arm 375 to a position nearly parallel to linear drive shaft 343 and most distal to linear actuator 340.

7

Figures 3, 4:
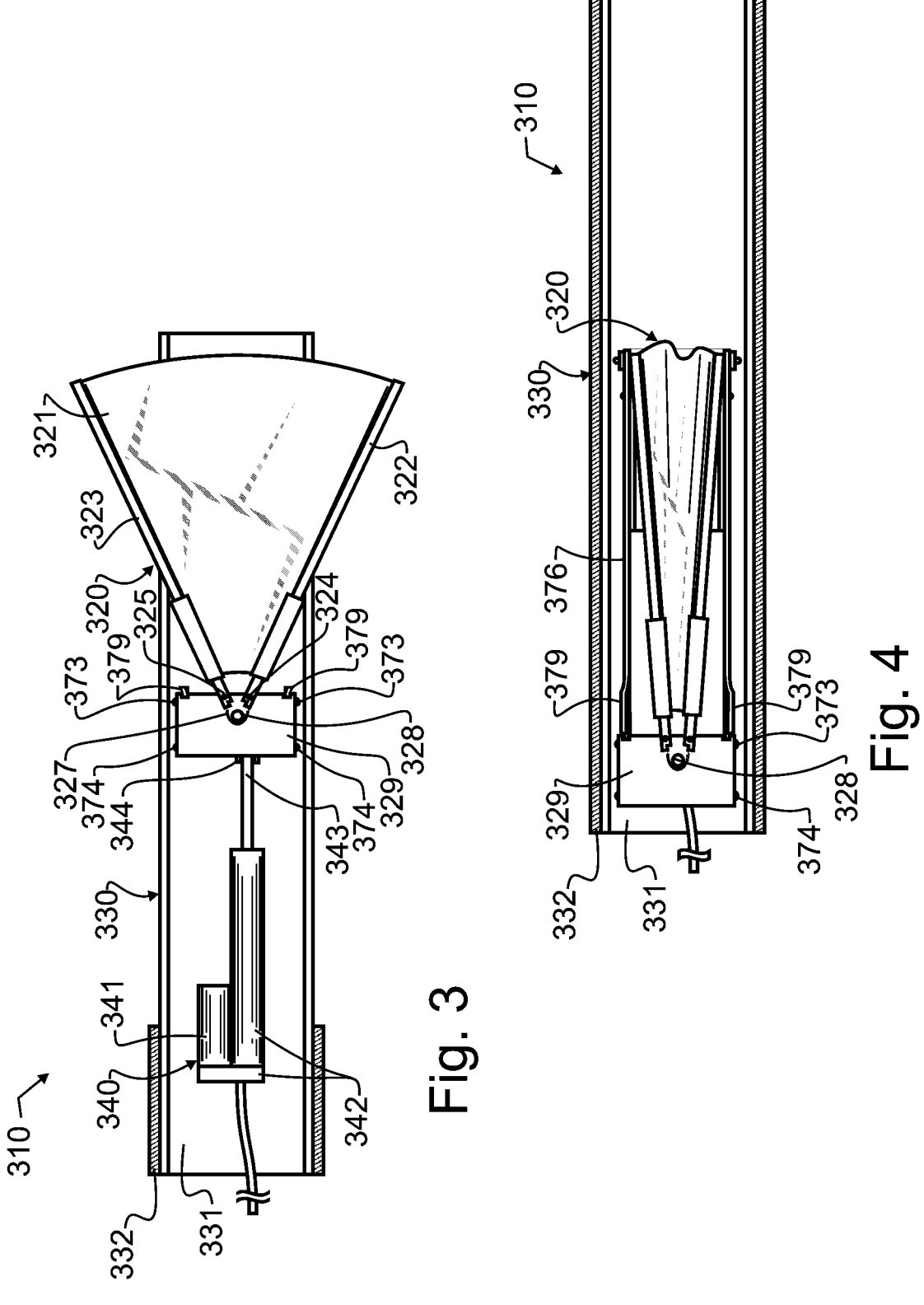
FIG. 3 illustrates the first alternative embodiment retractable spray shield for agricultural use of FIGS. 1-2 at an intermediate position between deployed and retracted position from a sectioned top view.
FIG. 4 illustrates the first alternative embodiment retractable spray shield for agricultural use of FIGS. 1-2 in a retracted position from a sectioned top view.

FIG. 3 illustrates retractable spray shield assembly 310 in a transitory position intermediate between the deployed and retracted positions. In this transitory position, linear actuator 340 is partially extended and spray shield 320 is in its expanded state with liquid barrier film 321 in the open position. FIG. 4 illustrates retractable spray shield assembly 310 in the fully retracted position with linear actuator 340 in its contracted state and liquid barrier film 321 in the closed position.

Figure 5:
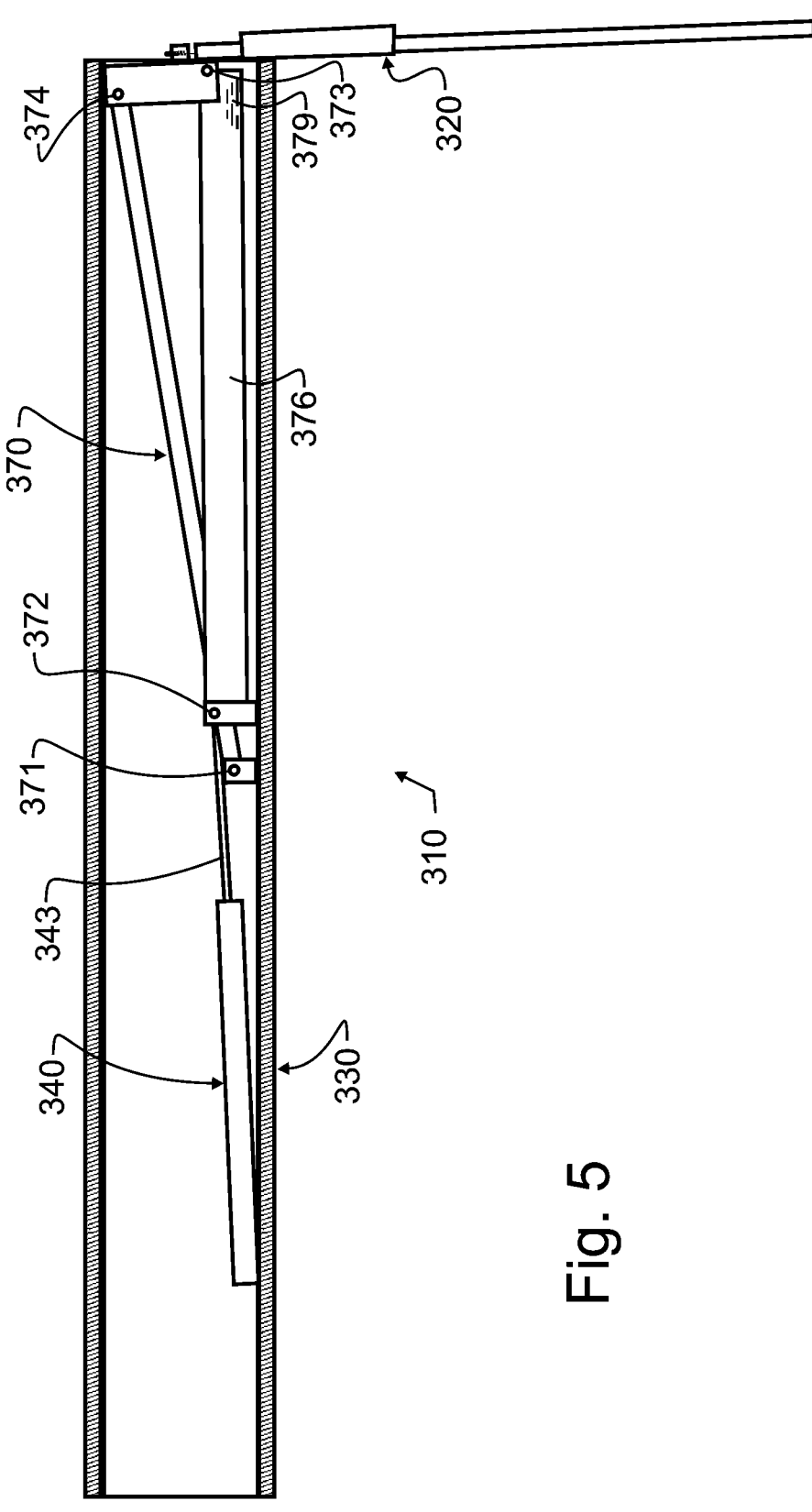
FIGS. 5-9 sequentially illustrate from a partial and sectioned front elevational view the first alternative embodiment retractable spray shield for agricultural use of FIGS. 1-2, retracting the spray shield from a fully deployed position in FIG. 5 to a fully retracted position in FIG. 9.
Figure 6:
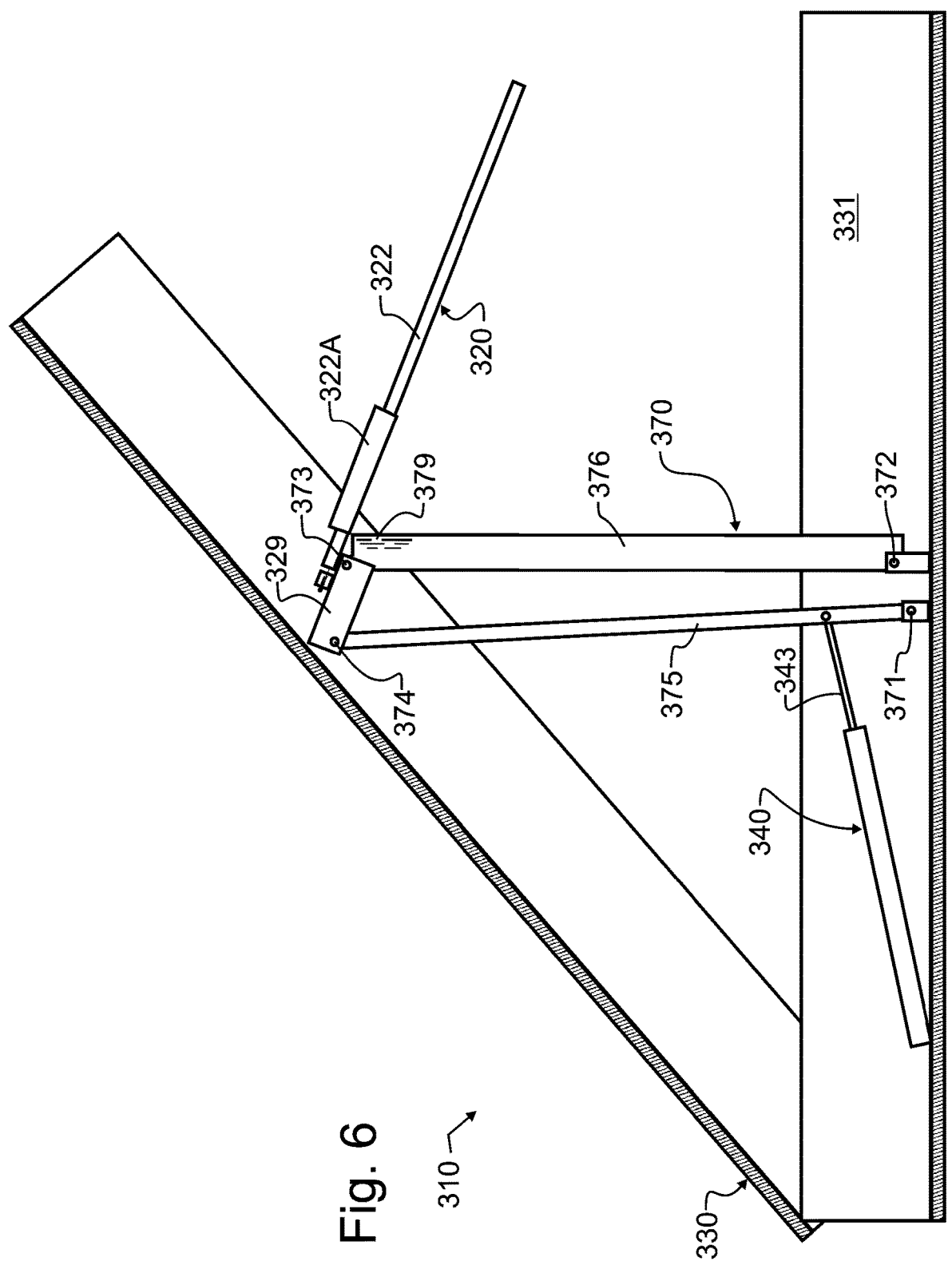
Figure 7:
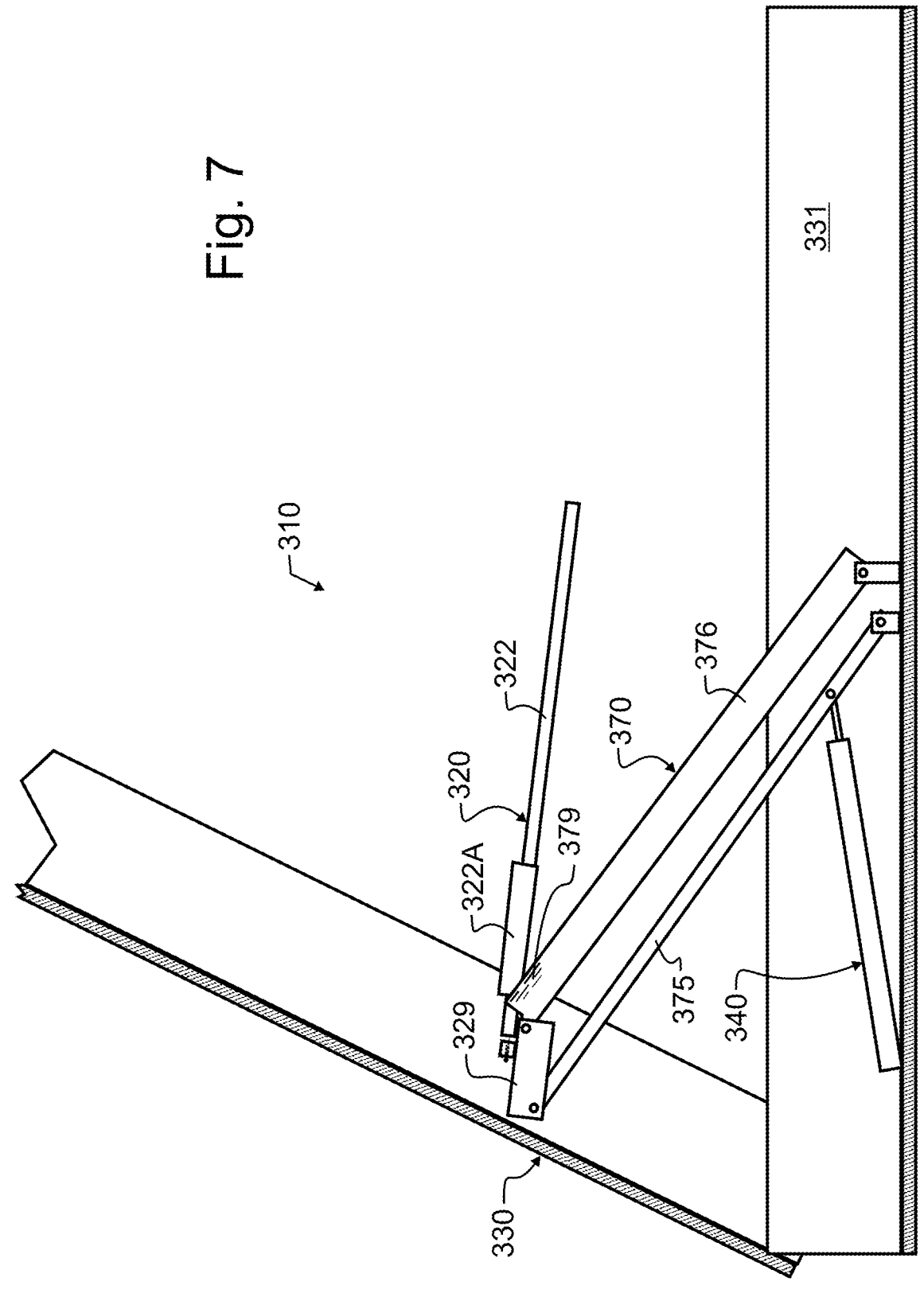
Figures 8, 9:
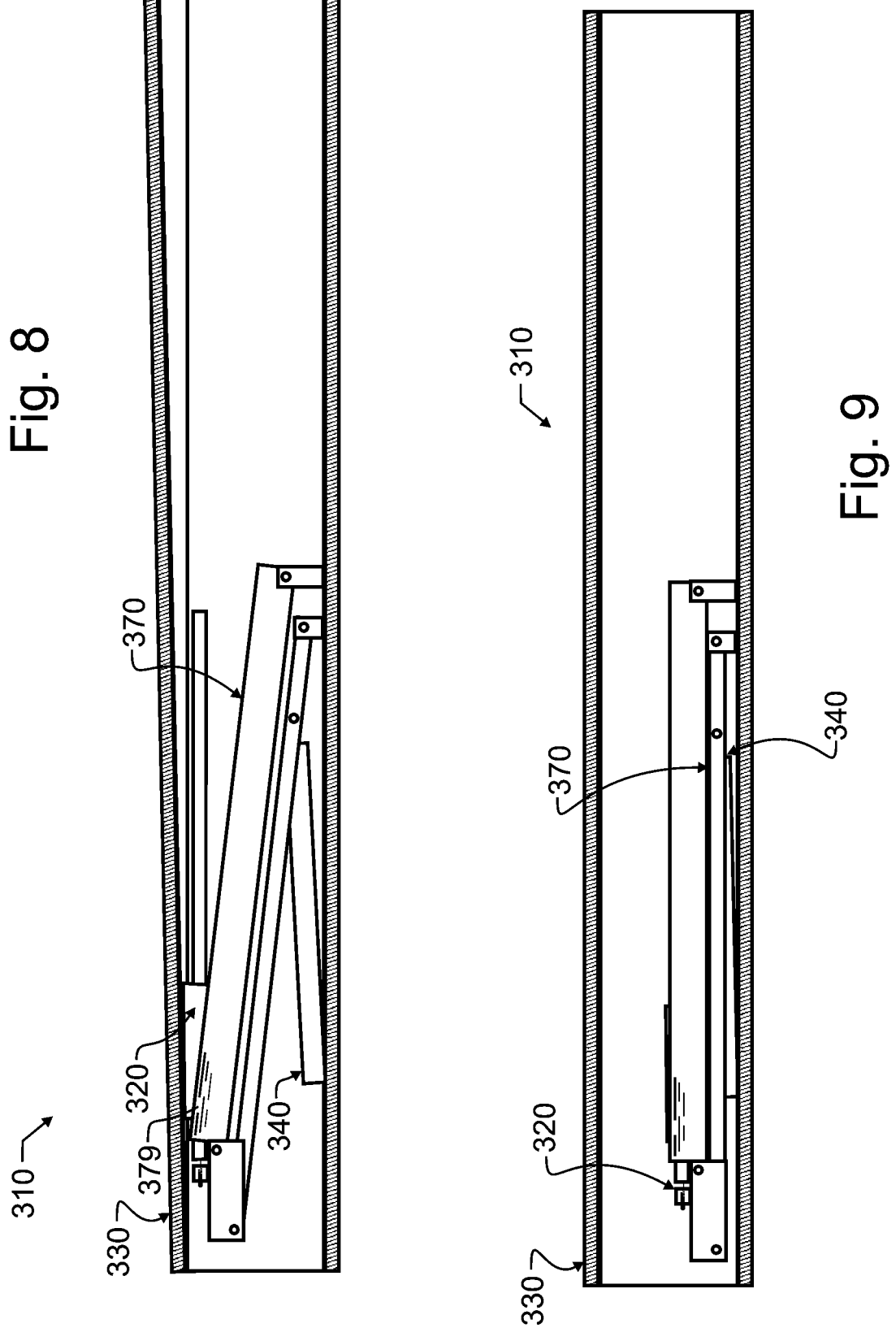
Figures 10, 11:
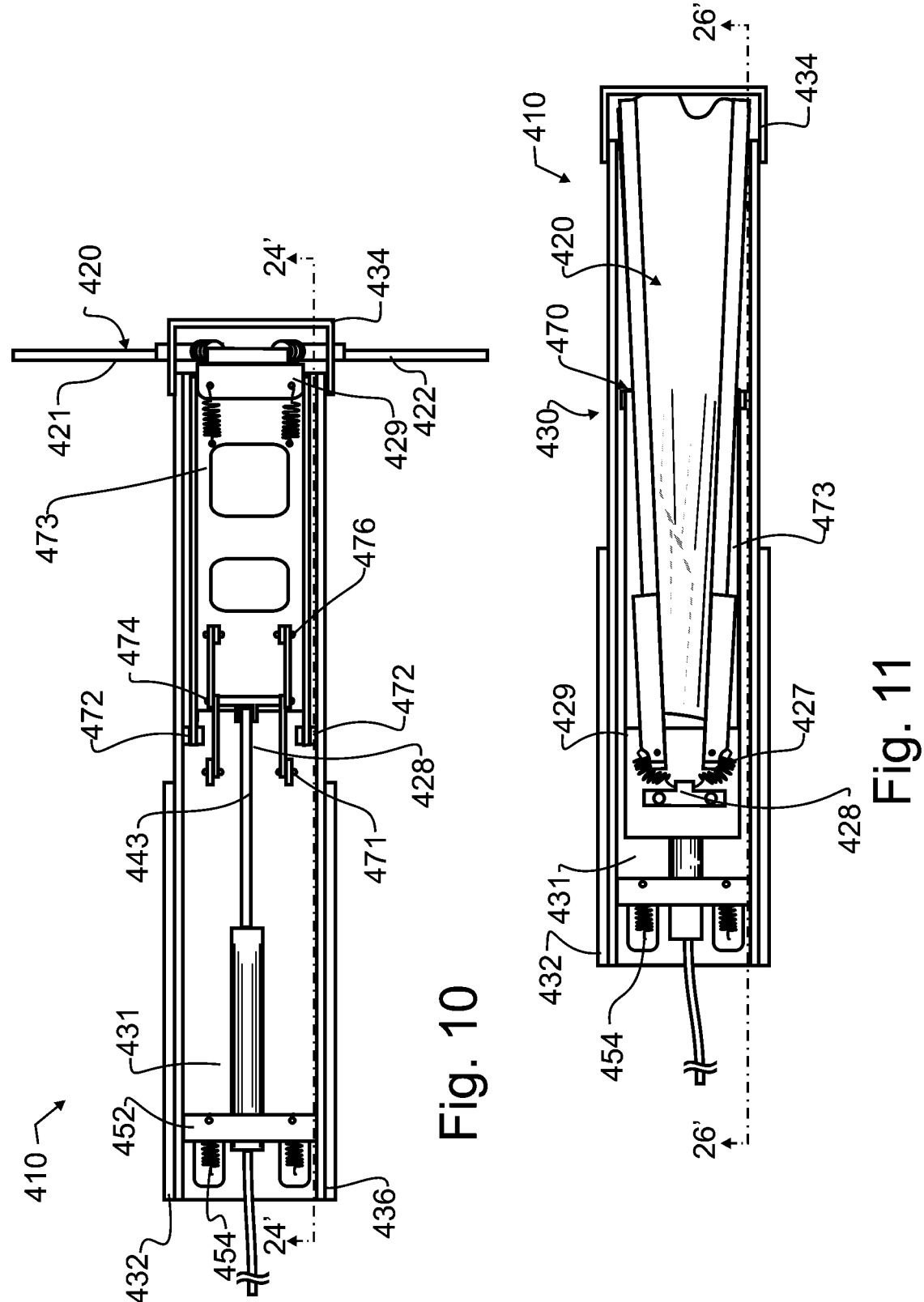
FIG. 10 illustrates a preferred embodiment retractable spray shield for agricultural use designed in accord with the teachings of the present invention in a deployed configuration from a top plan view.
FIG. 11 illustrates the preferred embodiment retractable spray shield for agricultural use of FIG. 10 in a retracted configuration from a top plan view.

The motion of retractable spray shield assembly 310 is best shown by the sequential illustrations of FIGS. 5 through 9. In FIG. 5, retractable spray shield assembly 310 is in its fully deployed position, with spray shield 320 in its open position. Moving from the fully deployed position of FIG. 5 to a transitory position of FIG. 6, linear actuator 340 retracts and brings spray shield 320 up and more adjacent or closer to linear actuator 340 by changing the angles within quadrilateral linkage 370. Moving from FIG. 6 to FIG. 7, linear actuator 340 retracts more, and spray shield 320 starts to engage with rotating arm guides 379. In a manner similar to guide blocks 131, rotating arm guides 379 guide spray shield legs 322 and 323 inward to begin closing spray shield 320. Moving from FIG. 7 to FIG. 8, quadrilateral linkage 370 continues to rotate spray shield 320 closer to linear actuator 340, in a back and downward or counterclockwise direction in the Figures, while spray shield 320 continues to close. Moving from FIG. 8 to FIG. 9, retractable spray shield assembly 310 is moved to its fully retracted position, and spray shield 320 is completely closed. The entire process of closing retractable spray shield assembly 310 is fully reversible, by extending linear drive shaft 343 and thereby moving pushing arm 375 and the balance of quadrilateral linkage 370 from the position of FIG. 9 transitioning to the position of FIG. 5.

While in first alternative embodiment retractable spray shield assembly 310, spray shield 320 is contracted by rotating arm guide 379, spray shield 320 may be contracted by other mechanisms. In one alternative embodiment, a rotating cam is provided that pushes on the shield legs 322 and 323 and pushes the legs closed as rotating arm 376 rotates about pivot 373. Another alternative embodiment uses a geared system to directly drive the shield legs 322 and 323 off of the rotation of rotating arm 376 about pivot 373.

Various embodiments of apparatus designed in accord with the present invention have been illustrated in the various figures. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

FIGS. 10 through 16 illustrate a preferred embodiment retractable spray shield assembly 410 affixed to a boom arm 1. Direction of travel is illustrated by arrow 426 in FIG. 16. Retractable spray shield assembly 410 is similar to the first alternative embodiment retractable spray shield assembly

8

310. Retractable spray shield assembly 410 incorporates a linear actuator 440 of known type including linear drive shaft 443. However, in preferred embodiment retractable spray shield assembly 410, linear drive shaft 443 drives pushing pivot 474 of a quadrilateral linkage 470 forward or backward around pivot 471. Quadrilateral linkage 470 is comprised of four sides including: the linkage arm connecting pivot 474 to pivot 476; the linkage arm connecting pivot 471 to pivot 474; the distance between lower pivots 471 and 472 which are held in position by unit holder 431; and the distance between lower pivot 472 and upper pivot 476, both which are affixed to transfer arm 473. Linear actuator 440 is preferably pivotally supported by the bottom of unit holder 431, with linear drive shaft 443 reciprocally extending therefrom generally longitudinally parallel to the longitudinal axis of unit holder 431. Also, like the third alternative embodiment, retractable spray shield assembly 410 has a spray shield 420 comprising a liquid barrier film 421, framing legs such as 422 best visible in FIGS. 10 and 11, and tension springs 427 which connect to a tension plate 428 via rotating shield holder 429. Unlike the third embodiment, shield retainer 434 keeps spray shield 420 confined to unit holder 431, and helps perform the retraction duty on shield 420 that rotating arm guides 379 do for the third embodiment retractable spray shield assembly 310.

Another notable difference between the third embodiment retractable spray shield assembly 310 and fourth embodiment spray shield assembly 410 is the separation of storage tube 430 into two portions, unit holder 431 and storage tube 432. A pair of strain relief springs 454 and spring holders 452 allow unit holder 431 to pivot about pintles 436, which allows unit holder 431 to pivot relative to storage tube 432. This pivot, opposed by tension within springs 454, allows for the moment of spray shield 420 into the deployed position even if there is interference during deployment of spray shield 420, without causing damage to retractable spray shield assembly 410. Such interference might occur with foreign bodies such as sticks or other plant matter or other obstacles or for other unanticipated reasons.

Figure 12:
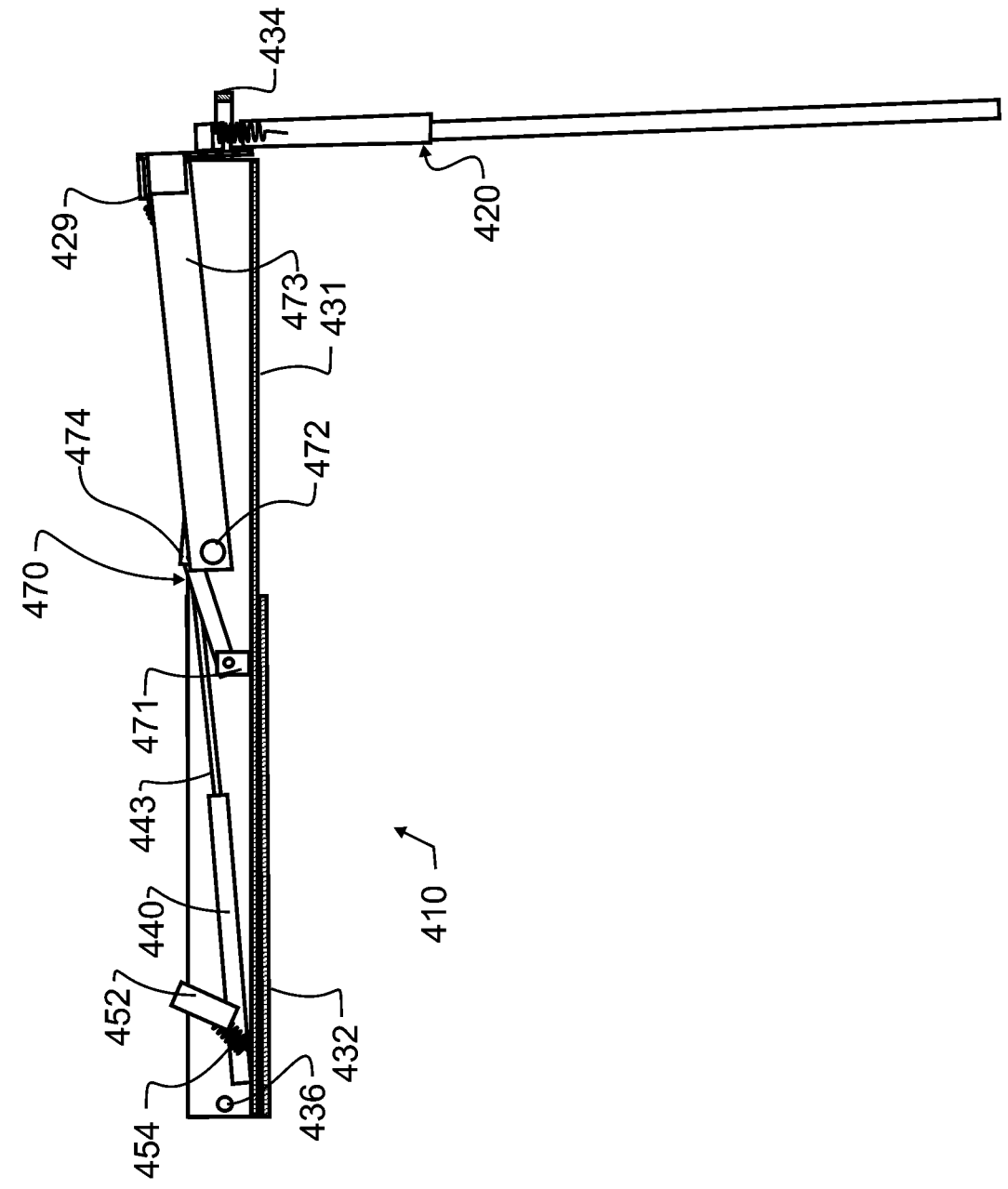
FIG. 12 illustrates the preferred embodiment retractable spray shield for agricultural use of FIG. 10 in a deployed configuration from a side elevational and sectional view taken along section line 24' of FIG. 10.
Figure 13:
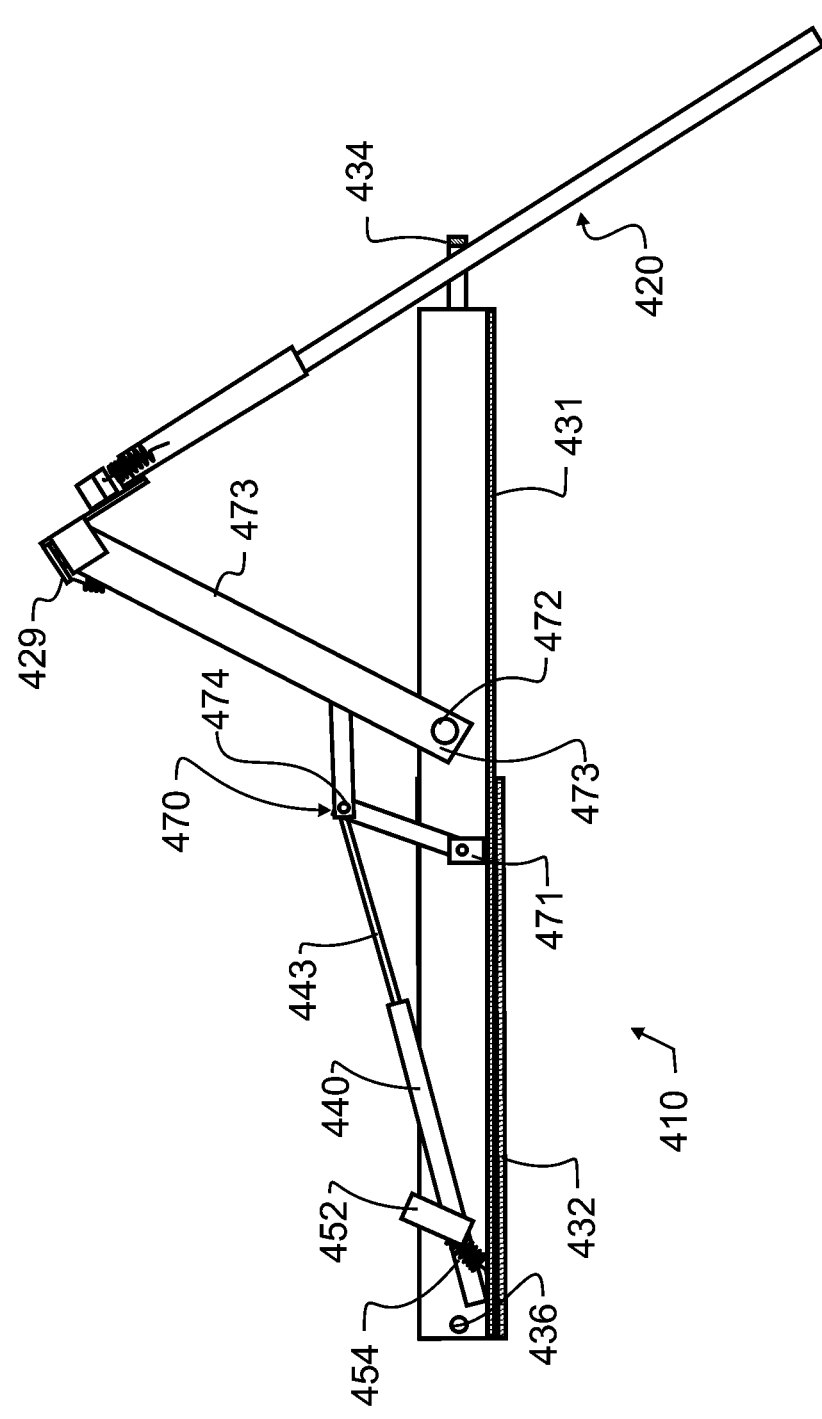
FIG. 13 illustrates the preferred embodiment retractable spray shield for agricultural use of FIG. 10 in an intermediate position between deployed and retracted position from a side elevational and sectional view taken along section line 24' of FIG. 10.
Figure 14:
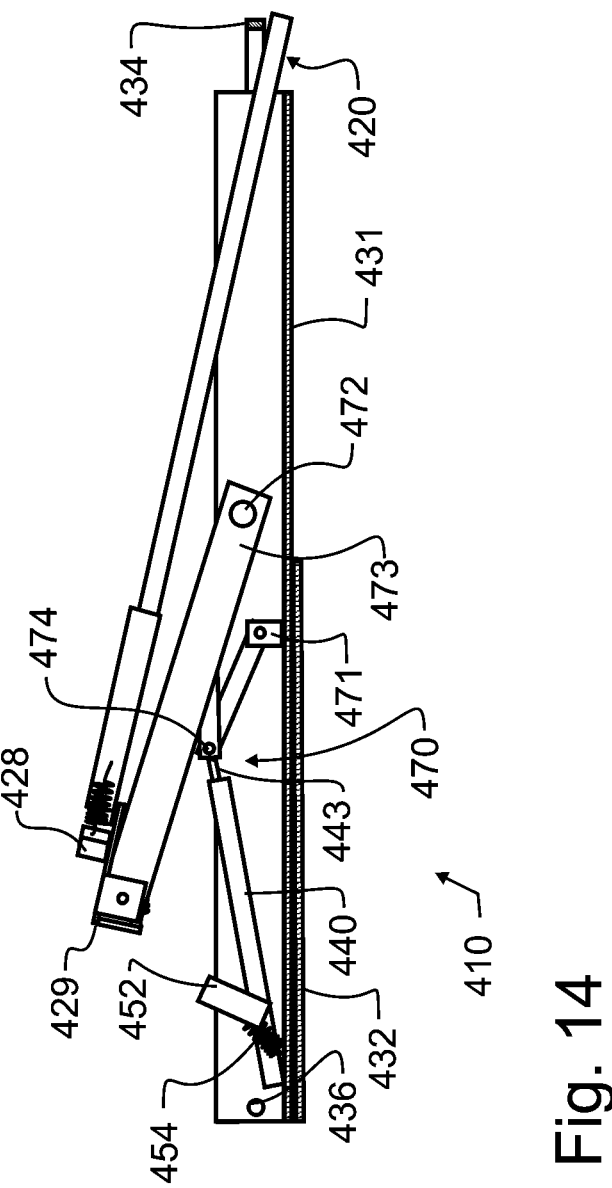
FIG. 14 illustrates the preferred embodiment retractable spray shield for agricultural use of FIG. 10 in a retracted configuration from a side elevational and sectional view taken along section line 26' of FIG. 11.
Figure 15:
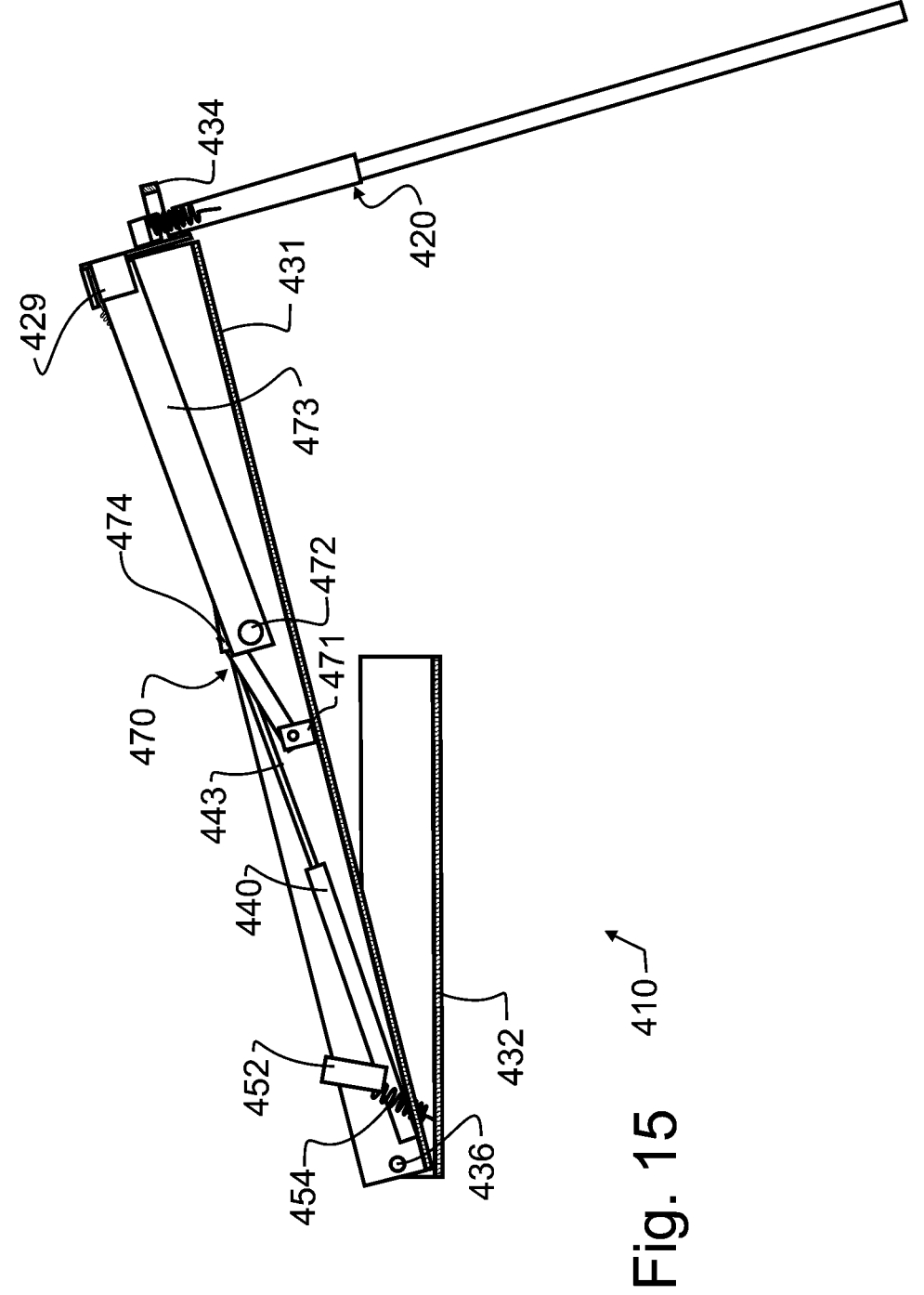
FIG. 15 illustrates the preferred embodiment retractable spray shield for agricultural use of FIG. 10 in a deployed configuration from a side elevational and sectional view similar to that of FIG. 12, showing the strain relief active with the pivot and strain relief springs activated.

In preferred embodiment retractable spray shield assembly 410, the combination simple rectangular frame of unit holder 431 and guard 434 replace the first alternative embodiment storage tube 330. Guard 434 is placed adjacent to and preferably configured to longitudinally co-extend parallel to the length of transfer arm 473 when spray shield 420 is in the deployed position, such as illustrated in FIG. 12. As evident from FIG. 12, when spray shield 420 is in the deployed position, nearly all of the drive components and drive linkage are located within unit holder 431. However, transfer arm 473 rises out of unit holder 431, making it and associated components vulnerable to damage from crops or other obstacles. Guard 434, placed in a position leading transfer arm 473, will deflect such obstacles and thereby protect transfer arm 473 and associated components from unnecessary wear and damage.

Figure 16:
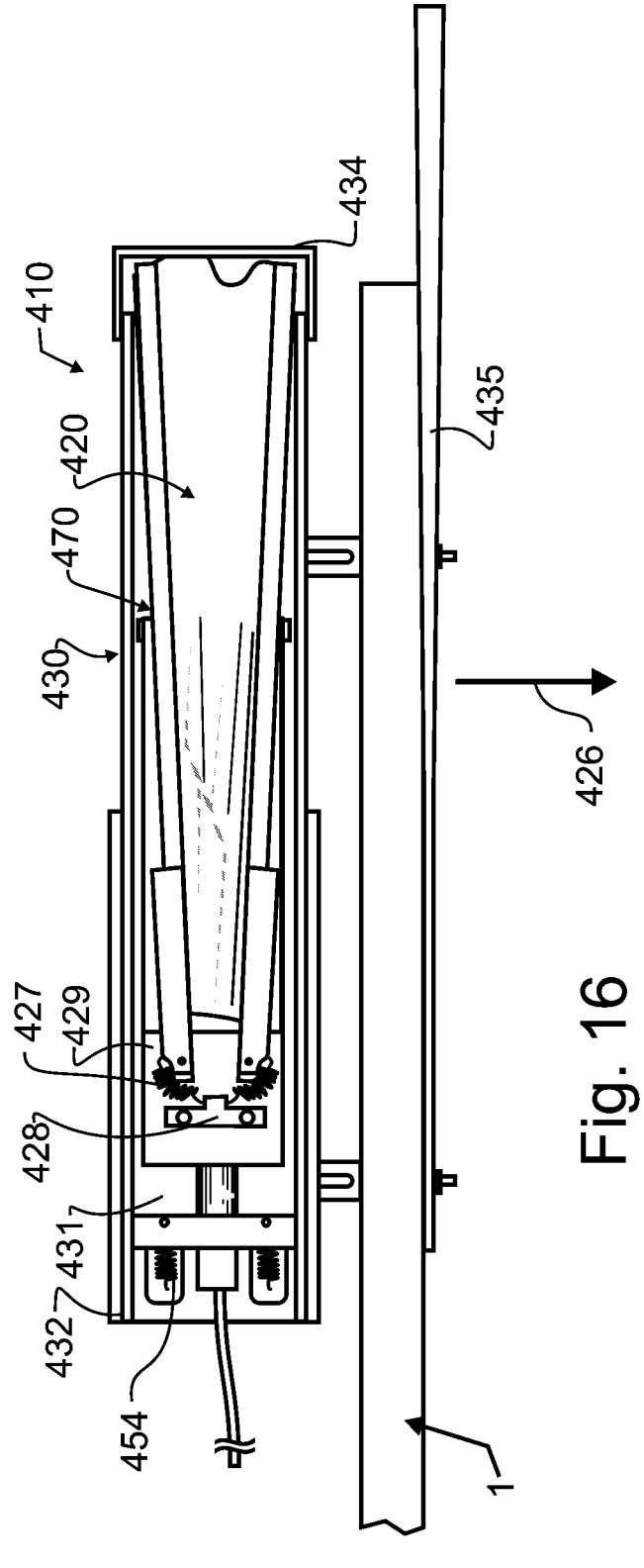
FIG. 16 illustrates the preferred embodiment retractable spray shield for agricultural use of FIG. 10 in a retracted configuration and further affixed to a simplified boom arm from a top plan view.

FIG. 16 illustrate retractable spray shield assembly 410 affixed to a simplified boom arm 1 for purposes of illustration. As illustrated therein, retractable spray shield assembly 410 including guard 435 is bolted to boom arm 1 for exemplary and non-limiting purpose, though a myriad of suitable methods of attachment are known in the mechanical arts that are considered incorporated herein in alternative embodiments.

A wide variety of materials may be used in the fabrication of preferred embodiment retractable spray shield assembly 310, 410, including spray shield 320, 420, storage tube 330, 430, and deployment drive 340, 440. These materials may include metals, polymers and resins, elastomers, glass and ceramic compositions, and laminates, composites, or combinations thereof. However, the materials should be selected to withstand the forces that will be encountered during use, the extremes and vagaries of temperature, weather, and sunlight, and the wear and tear that will be incurred during use.

The spray shields 320, 420 illustrated herein will preferably comprise a relatively large and generally flaccid generally triangular-shaped liquid barrier film 321, 421 that serves to block the passage of any significant amount of liquid there through. While a liquid impervious and hydrophobic material such as plastic sheet manufactured from polyethylene terephthalate, polyethylene, or the like may be preferred for some applications, fabric incorporating any of a variety of materials will also be acceptable for some applications. One such fabric is known commercially as rip-stop nylon. Regardless of the material, liquid barrier film 321, 421 must be sufficiently durable to withstand the force of the spray emanating from spray nozzles, to also withstand repeated collapsing when being retracted, to withstand repeated fanning when being deployed, and to provide sufficient chemical resistance to withstand exposure to the variety of liquids that may be sprayed by prior art agricultural spray boom 1. Liquid barrier film 321, 421 will also preferably have adequate ultra-violet resistance to withstand significant outdoor exposure.

As may be appreciated, while several deployment drives 340, 440 and alternatives thereto have been described, any deployment and concealment drive capable of rotating spray shields 320, 420 through an approximate 90 degree arc of travel will be considered to be incorporated herein. Electrical drives are most preferred, owing to the low weight and simple installation required for electrical wire extending the length of the boom. For exemplary and non-limiting purpose, such drives may also include solenoids and other linear motors. Nevertheless, fluid motors including hydraulic, pneumatic, and other drives may be used in alternative embodiments. Controls in some embodiments will be provided within an operator cab that are appropriate for the type of drive, for exemplary and non-limiting purpose such as electrical, pneumatic, or hydraulic switches.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. In combination, an agricultural spray machine, an agricultural spray boom, and a retractable spray shield for agricultural use, the agricultural spray machine having:
- a drive train;
- a liquid tank; and
- a pump receiving a liquid held within said liquid tank;

the agricultural spray boom having:
- a boom arm extending at least in part in a direction transverse to a forward direction of travel of said agricultural spray machine; and
- at least one spray nozzle suspended from said boom arm and in fluid communication with said pump;

the retractable spray shield for agricultural use having:
- a liquid barrier film;
- a storage tube configured to receive and store said spray shield, said storage tube having

- a storage tube bottom and a storage tube length, said storage tube length defining a storage tube longitudinal axis,
- a unit holder having a length defining a unit holder longitudinal axis parallel to said storage tube longitudinal axis, said unit holder supporting said liquid barrier film, and
- a pintle defining an axis of rotation transverse to said storage tube longitudinal axis and coupling said unit holder to said storage tube, said pintle configured to allow said unit holder to pivot about said pintle relative to said storage tube;
- at least one strain relief spring opposing rotation of said unit holder about said pintle relative to said storage tube;
- a deployment drive rotating said liquid barrier film relative to said storage tube between a first stored position adjacent to said storage tube and a second deployed position more perpendicular to said storage tube; and
- a boom arm coupler adapted to couple said retractable spray shield to said agricultural spray boom and simultaneously locate said liquid barrier film adjacent to and in a spray pattern of said at least one spray nozzle when said liquid barrier film is in said second deployed position.

2. The combination agricultural spray machine, agricultural spray boom, and retractable spray shield for agricultural use of claim 1, wherein said storage tube has a U-shaped cross-section.

3. The combination agricultural spray machine, agricultural spray boom, and retractable spray shield for agricultural use of claim 2, wherein said unit holder has a U-shaped cross-section that nests within said storage tube, said at least one strain relief spring drawing said unit holder into a position extending generally parallel to storage tube.

4. The combination agricultural spray machine, agricultural spray boom, and retractable spray shield for agricultural use of claim 2, wherein said liquid barrier film further comprises a pair of framing legs, each of said pair of framing legs coupled to an opposed edge of said liquid barrier film.

5. The combination agricultural spray machine, agricultural spray boom, and retractable spray shield for agricultural use of claim 4, further comprising:
- a first pintle coupling a first one of said pair of framing legs to a hinge plate; and
- a second pintle coupling a second one of said pair of framing legs to said hinge plate.

6. The combination agricultural spray machine, agricultural spray boom, and retractable spray shield for agricultural use of claim 5, further comprising:
- a spring guide post intermediate between said first and second pintles; and
- a tension spring wrapped about said spring guide post and configured to operatively stretch said pair of framing legs apart from each other and thereby expand said spray shield toward a planar, generally triangular geometry.

7. The combination agricultural spray machine, agricultural spray boom, and retractable spray shield for agricultural use of claim 1, wherein said liquid barrier film further comprises a generally triangular and flaccid liquid barrier film.

8. The combination agricultural spray machine, agricultural spray boom, and retractable spray shield for agricultural use of claim 1, wherein said deployment drive comprises:

a motor;

a drive shaft;

a quadrilateral linkage having a first lower pivot affixed to said unit holder;

a second lower pivot affixed to said unit holder at a location separated along said unit holder longitudinal axis from said first lower pivot and also pivotally affixed to a transfer arm and thereby defining a first fixed distance;

a second pivot affixed to said transfer arm at a location separated along a longitudinal axis of said transfer arm from said second lower pivot and thereby defining a second fixed distance;

a first linkage arm extending between and coupling a pushing pivot with said second pivot and thereby defining a third fixed distance;

a second linkage arm extending between and coupling said first pivot to said pushing pivot and thereby defining a fourth fixed distance;

said pushing pivot additionally coupled to said drive shaft to shift said quadrilateral linkage responsive to being driven by said drive shaft.

9. The combination agricultural spray machine, agricultural spray boom, and retractable spray shield for agricultural use of claim 8, wherein said hinge plate is pivotally coupled with said transfer arm.

10. The combination agricultural spray machine, agricultural spray boom, and retractable spray shield for agricultural use of claim 9, further comprising at least one spring biasing a position of said hinge plate relative to said transfer arm.

11. The combination agricultural spray machine, agricultural spray boom, and retractable spray shield for agricultural use of claim 1, wherein said agricultural spray machine further comprises:

an operator cab configured to support an operator and provide actuatable operator controls; and an electrical system configured to selectively provide electrical power to said deployment and concealment drive responsive to activation of at least one of said operator controls.

\* \* \* \* \*